United States Patent [19]

Meadors

[11] 4,077,756

[45] Mar. 7, 1978

[54] INJECTION MOLDING EXTRUSION MIXER

[75] Inventor: William R. Meadors, Marion, Ind.

[73] Assignee: Peerless Machine & Tool Corporation, Marion, Ind.

[21] Appl. No.: 721,291

[22] Filed: Sep. 8, 1976

[51] Int. Cl.² .............................................. B29F 3/02
[52] U.S. Cl. ............................... 425/207; 425/192 R;
425/557; 425/586; 366/76; 366/77
[58] Field of Search ..... 425/251, 244, 199, DIG. 228,
425/200, 204, 207, 192 R, 197, 557, 583, 558,
578, 586; 259/98, 4 AB, 4 AC, 4 R, 185;
100/185

[56] References Cited

U.S. PATENT DOCUMENTS

| | | | |
|---|---|---|---|
| 2,813,300 | 11/1957 | Hausman | 259/98 X |
| 3,284,854 | 11/1966 | Kutik | 259/98 |
| 3,508,298 | 4/1970 | Seidl | 425/251 X |
| 3,550,912 | 12/1970 | Melnikov et al. | 259/4 AB |
| 3,609,808 | 10/1971 | Jacobi et al. | 425/192 |
| 3,770,249 | 11/1973 | Schmitt | 259/4 AB X |

Primary Examiner—Francis S. Husar
Assistant Examiner—William R. Briggs
Attorney, Agent, or Firm—Jenkins, Coffey & Hyland

[57] ABSTRACT

Mixer apparatus for use with injection molding, extrusion or mixing and compounding machines wherein a melt chamber is lined with a series of stacked Belleville spring washers to provide a series of axially narrow, annular extrusion passages between the washers. A quantity of thermoplastic material is supplied to the melt chamber at the inner diameter of the washers and is therein subjected to pressure to cause extrusion of the material through the passages. From the washers, the material is directed through axially extending slots about the washers to a mold cavity or forming die.

22 Claims, 4 Drawing Figures

INJECTION MOLDING EXTRUSION MIXER

BACKGROUND OF THE INVENTION

This invention relates to plastic melting and mixing apparatus. More specifically, this invention relates to mixer apparatus for use with an injection molding machine, extrusion machine or mixing and compounding machine.

A wide variety of plastic extrusion and injection molding machines and the like are available throughout the prior art. These machines typically comprise a cylindrical melt chamber for receiving measured quantities, or charges, of fused or molten resin or thermoplastic material. In injection molding, each charge of material is forced by a piston or the like from the chamber into a mold cavity of the desired size and shape. There the material is allowed to cool to form the desired molded object, at which time the cooled object is stripped from the mold cavity and the process is repeated. In an extrusion machine, the material is delivered into the melt chamber continuously and delivered therefrom to a forming die. In a mixing machine, a plurality of materials are continuously delivered to the chamber for mixing therein for subsequent processing.

One major problem with such machines has been the delivery of a uniformly-mixed, uniformly-heated charge of thermoplastic material to the melt chamber, and further from the chamber to the mold cavity or forming die. That is, for example, various additives such as coloration pigments are often included with the material delivered to the melt chamber, and it is highly desirable to disperse uniformly such additives throughout the resin to assure proper color consistency in the final molded object. Further, since different chemical substances have different heating coefficients, it is highly desirable to disperse evenly the additives and the material to assure uniform temperatures throughout the charge. In this manner, the existence of localized stress-forming "hot spots" or "cold spots" which can adversely affect the charge plasticity and corresponding quality of the molded product are avoided.

In the prior art, the mixing and/or extrusion of the material along with additives such as coloration pigments typically has been done with heated multi-channel premixing devices. That is, the molten material and pigments, etc., are forced to flow one or more times through a series of narrow channels in close proximity with a heat source to achieve uniform pre-mixing and pre-heating. Then the heated mixture is delivered to the melt chamber of the machine. Such processes are not entirely satisfactory, however, in that they require relatively expensive heating and mixing apparatus, and it has been found that such apparatus does not consistently provide the desired uniform mixing of the molten charge or uniform temperature throughout the molten charge. As a result, the molten charge is usually slightly overheated to assure that all portions thereof achieve at least a minimum temperature level. This undesirably results in non-uniform plasticity of the charge and slower machine cycling times.

The mixer apparatus of this invention overcomes the disadvantages of the prior art by eliminating pre-heating and pre-mixing of the charge prior to delivery thereof to a melt chamber of a molding machine. Moreover, the apparatus of this invention assures uniform heating and mixing of the charge prior to injection of the charge into a mold cavity, forming die, or the like.

SUMMARY OF THE INVENTION

In accordance with one embodiment of the invention, an injection molding machine has shuttle delivery apparatus for delivering to a melt chamber successive measured charges of a suitable thermoplastic material together with associated coloration pigments, etc. In the melt chamber, the charge is heated to a molten state and subjected to predetermined pressure by a hydraulically actuated piston. The piston forces the molten charge outwardly against the chamber walls which are lined with a series of concentric Belleville spring washers stacked in an alternating manner to provide a corresponding series of axially narrow, annular extrusion passages between the washers. The molten charge is extruded outwardly through these extrusion passages as a series of thin films to assure uniform dispersion and heating of the entire charge. From the washers, the charge flows through a passage disposed about the washers and further to a mold cavity for molding.

In an injection molding machine, the Belleville washers are vertically stacked in a cylindrical melt chamber and are tightly retained between an upper shoulder and a lower valve assembly. The valve assembly includes a valve stem closing the bottom of the injection chamber and operatively associated with a lower valve head carried between the melt chamber slots and the mold cavity. In operation, pressure in the injection chamber causes downward movement of the valve stem and the valve head to assist extrusion of the molten charge outwardly between the washers to flow through axially extending slots disposed about the washers and into the now-open mold cavity. Conveniently, when the mold cavity is filled, back pressure from the extruded material on the valve head causes the valve assembly to return upwardly and close the mold cavity.

BRIEF DESCRIPTION OF THE DRAWINGS

The accompanying drawings illustrate the invention. In such drawings.

DETAILED DESCRIPTION OF THE PREFERRED EMBODIMENT

Figure 1:
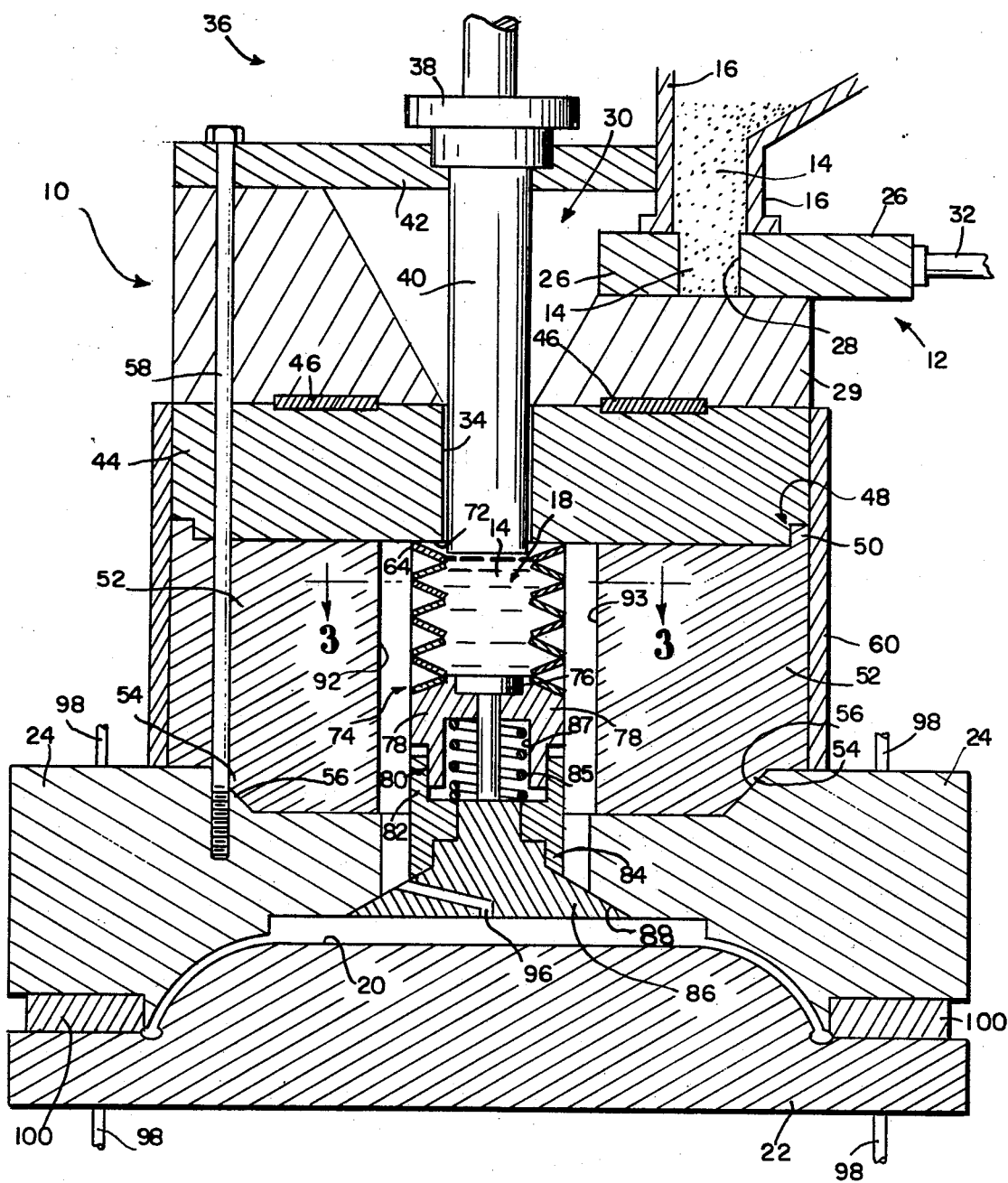
FIG. 1 is a vertical section of an injection molding machine having mixer apparatus of this invention.

The mixer apparatus of this invention is shown by way of example in FIG. 1 for use with an injection molding machine 10, which generally comprises shuttle feed apparatus 12 for sequentially feeding predetermined quantities of a mixture 14 of a suitable thermoplastic powdered material together with coloration pigment, etc., from a hopper 16 to a generally cylindrical injection or melt chamber 18. In the melt chamber 18, the mixture 14 is heated to a molten state and then delivered as will be hereinafter described to a mold cavity 20 formed by complementary-shaped mold halves 22 and 24.

Figure 2:
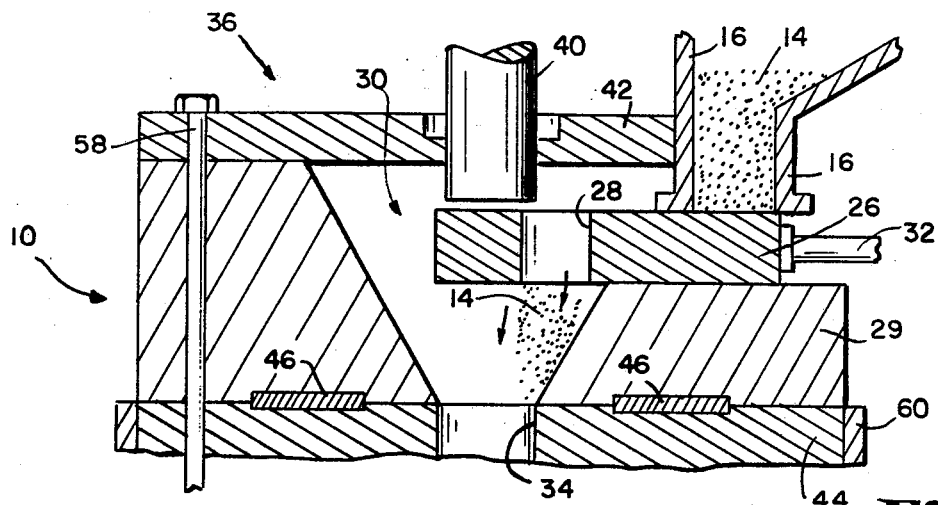
FIG. 2 is a fragmented vertical section of a portion of the machine in FIG. 1, showing shuttle delivery of resinous material.
Figure 3:
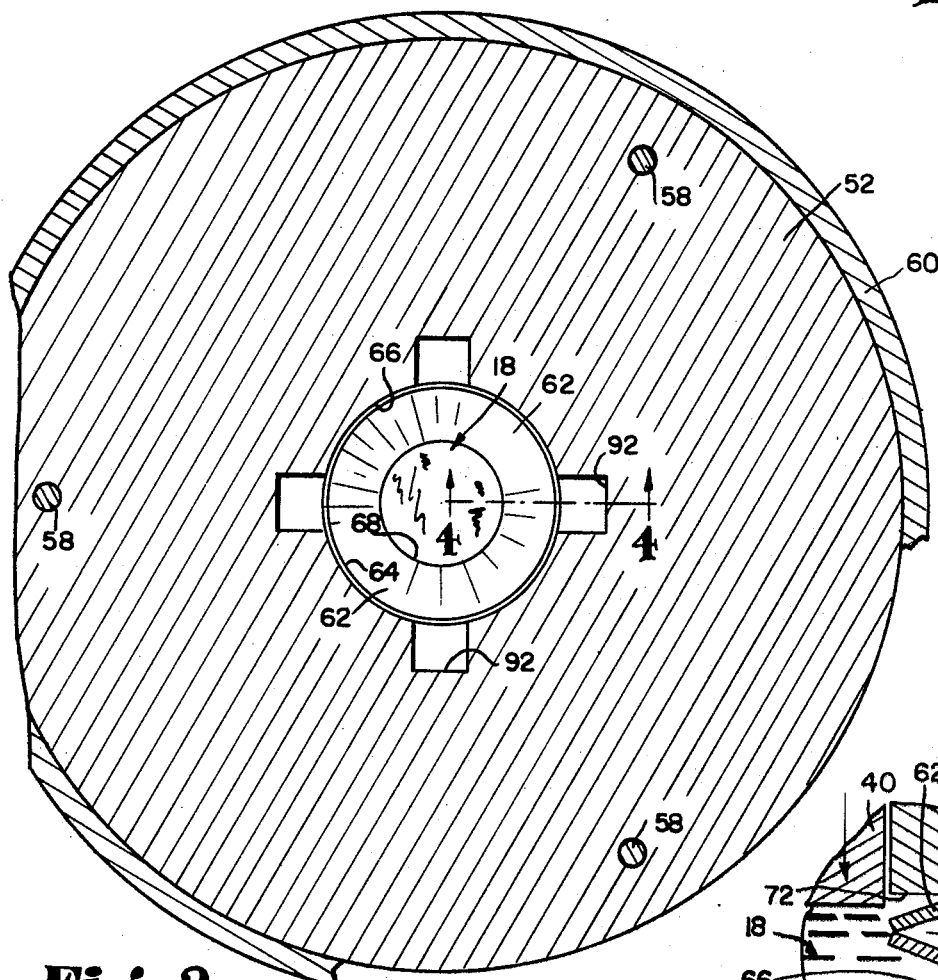
FIG. 3 is an enlarged fragmented horizontal section taken on the line 3—3 of FIG. 1.

The shuttle feed mechanism 12 comprises a shuttle box 26 having a central opening 28 of a predetermined size and shape for holding a metered quantity, or charge, of the mixture 14. The shuttle box 26 is slidably carried between the lower extent of the hopper 16 and the upper planar surface of a slide 29 by a shuttle arm 32 connected to suitable driving means (not shown). The box 26 is reciprocated between a "fill" position as shown in FIG. 1 where its central opening 28 gravitationally receives a charge of the mixture 14, and an "unload" position as shown in FIG. 2 with the central opening 28 disposed within a funnel-shaped cavity 30 above the injection chamber 18. The mixture 14 falls from the shuttle box 26 into the funnel cavity 30 and further through a cylindrical machine bore 34 into the melt chamber 18.

The injection molding machine 10 has an upper housing 36 in which is mounted a hydraulic ram 38 coupled at its upper end to suitable hydraulic actuating apparatus (not shown). The ram 38 is coupled at its lower end to a downwardly projecting piston 40 received through a guide block 42. The piston 40 is movable between a retracted position as shown in FIG. 2 and an extended position as shown in FIG. 1 extending downwardly through the funnel cavity 30 and the machine bore 34 formed in a spacer block 44.

The spacer block 44 is positioned with respect to the shuttle slide 29 and the upper housing 36 by keys 46. The spacer block 44 is inwardly offset at its lower periphery, as at 48, for mating reception of an upwardly projecting peripheral flange 50 on an underlying injection cylinder 52 having the melt chamber 18 formed therein. This injection cylinder 52 in turn has a lower conical projection 54 for mating reception in a conical recess 56 formed in the upper surface of the upper mold half 24. Conveniently, the entire assembly, namely the upper housing 36, shuttle mechanism 12, spacer block 44, injection cylinder 52 and the upper mold half 24 are alignedly fixed with respect to each other by bolts 58.

A cylindrical heater band 60 is wrapped in close heat exchange relation about the spacer block 44 and the injection cylinder 52. The band is coupled to a suitable source of electric power (not shown) and serves to bring the spacer block 44 and the injection cylinder 52 up to a steady state temperature level. Typically, in practice, this temperature level is from about 300° F to about 700° F and is effective to rapidly change the mixture 14 from powder form to a molten state as the mixture falls into the melt chamber 18. Alternately, if desired, the band 60 can be provided with means for cooling the chamber 18.

When a charge of the mixture 14 is deposited in the melt chamber 18, the piston rod 40 is actuated in sequence to descend upon the now-molten mixture 14 and to apply a predetermined pressure thereto. To this end, the chamber 18 is circumferentially lined by a plurality of stacked spring washers 62, known as Belleville washers. These washers 62, as shown in detail in FIG. 4, each comprise an annular section of steel or the like having a circular outer base 64, or periphery, abutting the inside diameter 66 of the melt chamber 18. The washers each taper conically inwardly from their base and terminate at an inner diameter 68 so that each of the washers has a truncated conical cross section. The inner diameter 68 of the washers is slightly larger than the diameter of the piston 40, whereby the mixture 14 is initially received in that portion of the chamber 18 bounded by the inner diameter 68 of the washers. The washers 62 are vertically stacked in an alternating manner so that each washer inner diameter 68 abuts the inner diameter 68 of an adjacent washer, and each washer base 54 abuts the base of an adjacent washer. In this manner, the washers 62 define a plurality of axially thin, annular extrusion passages 70 between each pair of washers.

The Belleville washers 62 are constrained in the melt chamber 18 against upward movement by a lower shoulder 72 on the spacer block 44 extending radially inwardly above the melt chamber. Similarly, the washers 62 are fixed against substantial downward movement within the melt chamber by a valve assembly 74. The valve assembly 74 comprises a valve stem 76 carried in a cylindrical valve body 78 closing the bottom of the melt chamber 18 slidably guided thereby for vertical movement therein. The lower end of the valve body 78 is offset inwardly, as at 80, for reception within an upwardly projecting flange 82 of a cylindrical valve sleeve 84. Thus, the valve body is slidable with respect to the sleeve 84 and in accordance with a compression spring 85 carried in a cavity 87 between the valve body 78 and sleeve 84. The sleeve is in turn fixed with respect to a downwardly projecting, conically outwardly extending valve head 86. Importantly, this valve head 86 is adapted to seat on a valve seat 88 on the upper mold half 24, for reasons which will be hereafter described in more detail.

Figure 4:
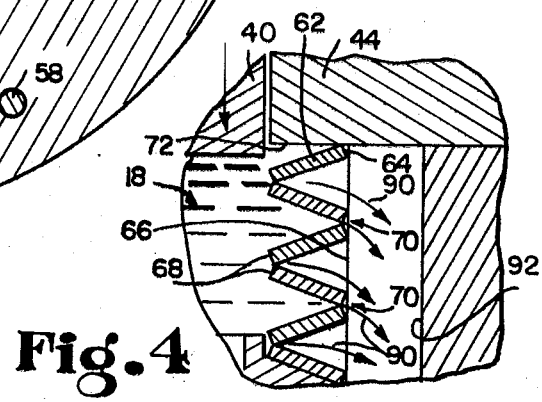
FIG. 4 is an enlarged fragmented vertical section taken on the line 4—4 of FIG. 3.

In operation, the piston rod 40 subjects the molten mixture 14 in the melt chamber 18 to substantial pressure. This causes a slight yielding of the valve assembly springs 85 and corresponding slight downward motion of the valve stem 76 and valve body 78. In practice, with a typical injection molding machine, this downward motion is from about 0.010 inch to about 0.100 inch, although this motion can be greater depending upon the individual application. This results in a slight separation of the Belleville washers 62 which, in addition to the spring effect of the washers, allows the molten mass in the melt chamber 18 to extrude outwardly through the extrusion passages 70 between the washers 62 as a series of uniformly mixed, uniformly heated thin films 90, as shown in FIG. 4. These thin film extrusions enter vertically axially extending slots 92, or keyways, formed in the inner wall 66 of the melt chamber, and are forced therethrough toward the valve head 86 and the mold cavity 20. While four axial slots 92 are shown, the number of slots can vary depending upon the plasticity of the extruded mixture and the surface heat transfer area desired. Further, with some materials, it is desirable to eliminate the slots 92 and to provide relatively greater clearance between the base 64 of each washer 62 and the inside diameter 66 of the melt chamber 18 to allow flow passage of the extruded material from the washers to the mold cavity.

The extruded mixture 14 in the slots 92 together with the pressure in the melt chamber causes downward pressure on the valve head 86 to separate the valve head from its valve seat 88. This allows the molten mixture to enter the mold cavity 20 between the mold halves 22 and 24, with said cavity being shown in FIG. 1 as comprising the shape of a shallow dish. When the mold cavity 20 is filled, the molten mixture therein creates back pressure on the valve head 86 to push it upwardly as shown in FIG. 1 to a closed position in contact with its valve seat 88. Conveniently, to assure complete filling of the mold cavity, a passage 96 in the valve head provides communication between one of the slots 92 and the radial center of the cavity 20.

With the valve head 86 in a closed position, the desired object is molded in the mold cavity 20. To this end, water tubing 98 is provided for speeding transition of the mixture in the cavity 20 from a molten state to a hardened state. Then the mold halves 22 and 24 are separated with suitable apparatus (not shown), and the molded piece is stripped downwardly from the mold cavity by a stripper ring 100.

While the mixer apparatus of this invention has been shown and described as for use with an injection molding machine, it should be understood that the mixer apparatus is equally applicable for use with extrusion machines, mixing machines, foam molding machines and the like. That is, the invention of this application is useful wherever a uniform dispersion of fused or molten thermoplastic material is required and wherein a series of stacked washers can be mounted in a chamber. Further, the invention is quickly and easily adaptable for use with existing injection, extrusion, etc. machines.

I claim:

1. In a machine having a cylinder with a generally cylindrical chamber for receiving thermoplastic material and pressurization means operatively associated with the chamber for applying pressure to the material in the chamber, a plurality of axially stacked annular washers lining the inside walls of the chamber for reception of the thermoplastic material into that portion of the chamber bounded generally by the inner diameters of said washers, said washers forming a plurality of axially narrow annular extrusion passages between said washers upon pressurization of the material; and retaining means at opposed ends of the chamber for retaining said washers in a stacked relation, said chamber being shaped relative to the outer diameters of said washers to provide a flow passage between said washers and the inside walls of the chamber whereby pressurization of the material in the chamber causes extrusion of the material outwardly through said extrusion passages between said washers and into said flow passages.

2. The invention as set forth in claim 1 wherein each of said washers comprises a spring washer having a truncated conical cross section.

3. The invention as set forth in claim 1 wherein each of said washers comprises a spring washer having a truncated conical cross section, and said washers are stacked in an alternating manner in the chamber so that the outer diameters of said washers abut the outer diameters of adjacent washers and the inner diameters of said washers abut the inner diameters of adjacent washers.

4. The invention as set forth in claim 1 wherein the pressurization means comprises a piston receivable into one end of the chamber, said washers each having an outer diameter for close slidable reception in the chamber and an inner diameter for close slidable reception of the piston, said cylinder having at least one slot formed in the inner walls of the chamber forming said flow passage.

5. The invention as set forth in claim 1 wherein the cylinder has a plurality of axially extending slots formed in the inner walls of the chamber forming said flow passage.

6. The invention as set forth in claim 1 wherein the machine comprises an injection molding machine having a plurality of mold sections forming a mold cavity, and with the addition of valve means carried between said flow passage and said mold cavity, said valve means being operatively associated with the pressurization means to open upon pressurization of the material in the chamber to allow extruded material to flow through said flow passage and into said mold cavity.

7. The invention as set forth in claim 6 wherein said valve means comprises a valve assembly slidably received in said chamber for closing one end thereof and for supporting said washers at said one end, said valve assembly having a valve head carried between said flow passage and said mold cavity, said valve assembly being slidably movable upon pressurization of the material in the chamber to allow a spacing between said washers to form said extrusion passages to permit the material to extrude outwardly through said extrusion passages and to allow the extruded material to flow through said flow passage and around said valve head into said mold cavity.

8. The invention as set forth in claim 6 wherein said valve means is operatively associated with said plurality of mold sections to close when said mold cavity becomes filled to prevent flow of extruded material through said flow passage and into said mold cavity.

9. The invention as set forth in claim 1 wherein the machine comprises an injection molding machine having a plurality of mold sections forming a mold cavity and wherein said pressurization means comprises a piston receivable into one end of the chamber; and said retaining means comprises an inwardly radiating shoulder at said one end of the chamber for retaining said washers and for allowing passage of the piston into the chamber, and valve means slidably received in the other end of the chamber for closing the other end of the chamber and for supporting said washers, said valve means having a valve head carried between said flow passage and said mold cavity and being slidably movable upon pressurization of the material in the chamber to allow a spacing between said washers to form said extrusion passages to permit material to extrude outwardly through said extrusion passages and to allow the extruded material to flow through said flow passage and around said valve head into said mold cavity.

10. A mixer apparatus comprising an injection cylinder having a generally cylindrical chamber; a plurality of axially stacked annular washers lining the inside diameter of said chamber; means retaining said washers in a stacked relation in said chamber and closing one end of said chamber when a thermoplastic material is received in that portion of the chamber generally bounded by the inner diameter of said washers; and pressurization means closing the other end of said chamber and applying pressure to the material in the chamber to cause extrusion of the material outwardly between said washers, the inside diameter of said chamber being shaped relative to the outer diameter of said washers to provide a flow passage between said washers and the inside diameter of said chamber whereby the material extruded outwardly between said washers flows into said flow passage.

11. The invention as set forth in claim 10 wherein each of said washers comprises a spring washer having a generally truncated conical cross section, and said washers are stacked in an alternating manner in said chamber so that the outer diameters of said washers abut the outer diameters of adjacent washers and the inner diameters of said washers abut the inner diameters of adjacent washers.

12. The invention as set forth in claim 10 wherein said flow passage is in communication with a mold cavity formed by a plurality of mold sections, and said retaining means comprises valve means slidably received in said chamber at said one end for closing said one end and having a valve head carried between said flow passage and said mold cavity, said valve means being movable upon subjecting to pressure the material in said chamber to allow a spacing between said washers to permit the material to extrude outwardly between said washers and to flow through said flow passage and around said valve head into said mold cavity.

13. The invention as set forth in claim 10 wherein said retaining means comprises valve means slidably received in said chamber at said one end for closing said one end and for supporting said washers thereat, and shoulder means at the other end of said chamber for retaining said washers thereat, said valve means being movable upon subjecting to pressure the material in said chamber to allow a spacing between said washers to permit the material to extrude outwardly between said washers.

14. The invention as set forth in claim 10 with the addition of temperature control means mounted on said injection cylinder for controlling the temperature within said chamber.

15. The invention as set forth in claim 10 wherein said injection cylinder has a plurality of axially extending slots formed in the chamber inside diameter forming said flow passage.

16. Mixer apparatus comprising an injection cylinder having a generally cylindrical chamber; a plurality of axially stacked annular spring washers lining the inside diameter of said chamber, said washers each having a truncated conical cross section and being stacked in an alternating manner so that the outer diameters of said washers abut the outer diameters of adjacent washers and the inner diameters of said washers abut the inner diameters of adjacent washers; means at one end of said chamber for closing one end of said chamber and for retaining said washers in a stacked relation; and a piston receivable into the other end of said chamber for subjecting to pressure a thermoplastic material in that portion of said chamber bounded generally by the inner diameter of said washers to cause said material to extrude outwardly between said washers, said chamber having an inside diameter shaped relative to the outer diameter of said washers to provide a flow passage about said washers whereby material extruded outwardly between said washers enters said flow passage.

17. The invention as set forth in claim 16 wherein said means comprises valve means slidably received in said one end of said chamber and having a valve head carried between said flow passage and a mold cavity in communication with said flow passage and defined by a plurality of mold sections, said valve means being movable upon subjecting to pressure material in said chamber to cause a spacing between said washers to permit the material to extrude outwardly between said washers and through said flow passage into said mold cavity.

18. The invention as set forth in claim 16 wherein said means further comprises a shoulder at said other end of said chamber.

19. The invention as set forth in claim 16 with the addition of feed means for supplying a thermoplastic material to said chamber.

20. The invention as set forth in claim 16 with the addition of temperature control means mounted on said injection cylinder for controlling the temperature in this said chamber.

21. The invention as set forth in claim 16 wherein said injection cylinder has a plurality of axially extending slots formed in the chamber inside diameter forming said flow passage.

22. In a machine having a cylinder with a generally cylindrical chamber for receiving thermoplastic material and pressurization means operatively associated with the chamber for applying pressure to the material in the chamber, a plurality of axially stacked annular washers lining the inside walls of the chamber, said washers each having a truncated conical cross section and being stacked so that the outer diameters of said washers abut outer diameters of adjacent washers and the inner diameters of said washers abut inner diameters of adjacent washers, said washers forming a plurality of axially narrow annular extrusion passages between said washers upon pressurization of the material; and retaining means at opposed ends of the chamber for retaining said washers in a stacked relation, said chamber being shaped relative to the outer diameters of said washers to provide a flow passage between said washers and the inside walls of the chamber whereby pressurization of the material in the chamber causes extrusion of the material through the extrusion passages between said washers and into said flow passage.

* * * * *